C. R. JAMES.
BALL BEARING.
APPLICATION FILED MAY 22, 1908.
920,149.
Patented May 4, 1909.
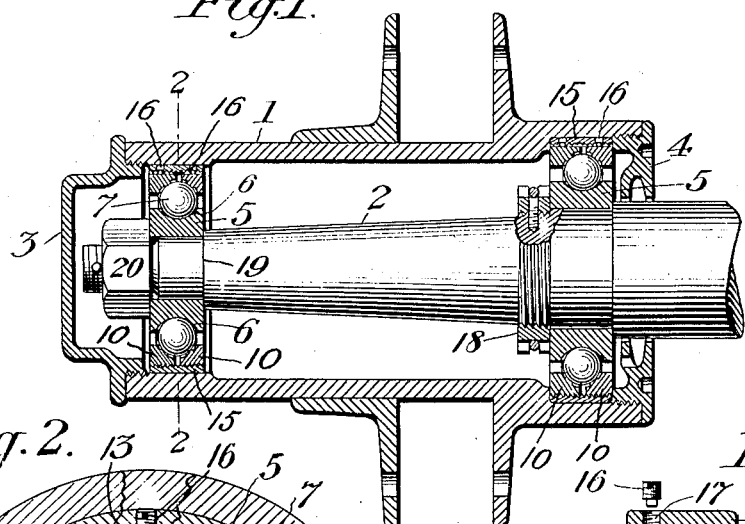
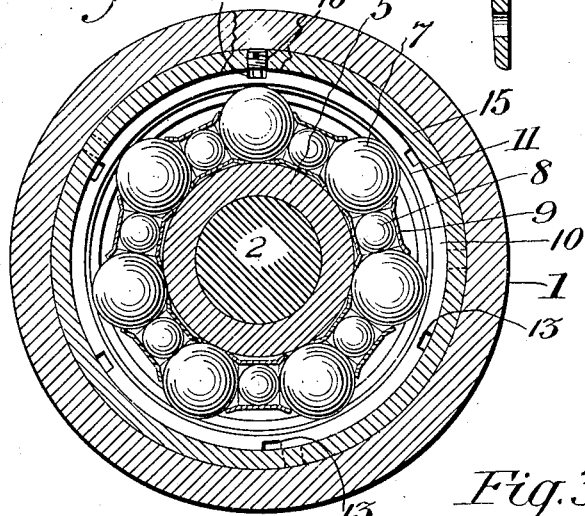
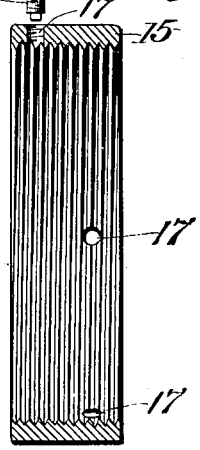
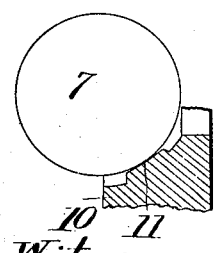
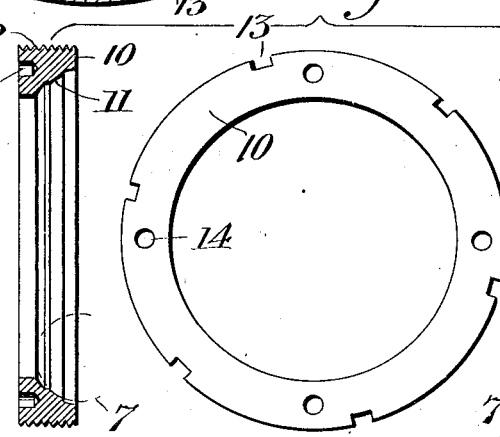
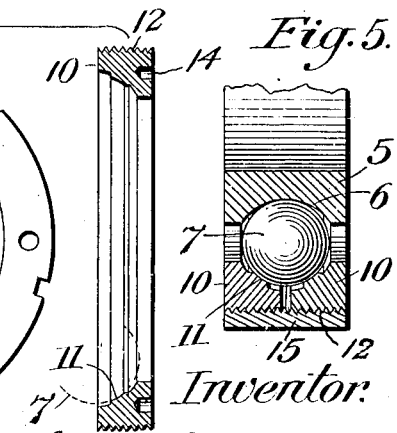
Witnesses.
D. W. Edelin.
E. A. Finckel.
Inventor:
Charles R. James
by W. H. Finckel Atty.

UNITED STATES PATENT OFFICE.

CHARLES R. JAMES, OF BOSTON, MASSACHUSETTS, ASSIGNOR TO CHAPMAN BALL BEARING COMPANY, A CORPORATION OF MAINE.

BALL-BEARING.

No. 920,149.        Specification of Letters Patent.        Patented May 4, 1909.

Application filed May 22, 1908. Serial No. 434,266.

*To all whom it may concern:*

Be it known that I, CHARLES R. JAMES, a subject of the King of Great Britain, residing at Boston, in the county of Suffolk and State of Massachusetts, have invented a certain new and useful Improvement in Ball-Bearings, of which the following is a full, clear, and exact description.

The object of this invention is to provide an efficient, simple and durable ball-bearing for automobile wheels and other uses involving hard wear, the bearing being capable of ready and accurate assembly and adjustment and of fixing the adjustment.

The invention comprises a grooved cone, in which the balls have a point bearing, a divided annular cup in which each half furnishes a point bearing for the balls, so that as between the cone and cup the balls have bearings at three points, as distinguished from extended segmental or peripheral bearings; and a ring or housing in which the cup-halves are capable of adjustment and of having such adjustment fixed.

In the accompanying drawings, illustrating the invention, in the several figures of which like parts are similarly designated, Figure 1 is a longitudinal section of a common form of wheel-hub and axle-journal, supplied with the bearings of this invention. Fig. 2 is a cross-section, on a larger scale, taken in the plane of line 2—2, Fig. 1, with part broken away to show one set-screw in place. Fig. 3 shows in cross-section and front elevation the halves of the cup. Fig. 4 is a cross-section of the cup housing. Fig. 5 is a cross-section, on a larger scale, of part of the assembled bearing. Fig. 6 is an enlarged view of a portion of one of the annular cup halves, with a ball shown in outline in contact with the center of the raised track.

The hub 1, axle 2, end-cap 3 and dust-guard cap 4 may be of usual or any approved construction. An identical ball-bearing of this invention is shown applied to the nib and collar of the journal and like reference characters are applied to both.

5 is the cone, having the groove 6 of larger radius than the load-bearing balls 7, and in which said balls are seated on a contact point, rather than by such extended superficial segmental or peripheral contact as would result were the cone-groove and the balls of the same radius, thus reducing friction and wear.

While the invention is not limited to any particular arrangement of balls, it is preferred to separate them by smaller separating balls 8 arranged in spool-like pockets 9, in such way that any two load-bearing balls and their interposed separating balls have their centers in the same line, which is a dead center line. See Chapman's patent No. 785,663, dated March 21, 1905.

The annular cup is composed of like halves 10, having raised tracks 11 on which the load-bearing balls have point contact, so that when these balls, the cone and cup are assembled, said balls have a three point contact with said cone and cup, as clearly illustrated in Fig. 5.

The cup-halves have screwthreaded peripheries 12, and are supplied with transverse grooves 13, and their faces are provided with spanner-holes 14. These annular cup-halves have their ball bearing faces constructed to partially inclose the balls so as to prevent escape of the balls in any direction. These halves are arranged upon opposite sides of the balls and secured in the annular, interiorly screwthreaded housing 15, and in this housing each cup-half may be turned so as to accurately adjust and center the balls, and when this is done the adjustment may be fixed in any suitable manner. As shown in the drawings this may be accomplished by inserting a stub-end set-screw 16 for each cup-half in one of the holes 17 in the housing opposite one of the grooves 13 in each of the cup-halves.

The cone is loose on the journal. The cup is of hardened steel and the housing of softer metal, so that hardness and elasticity are combined in a marked degree.

The preferred construction of cup-halves and housing is to provide one side of the housing with a single set-screw hole and then turn in the cup-half and set it by turning down the set-screw into an adjacent groove in that half. When this is done, the balls are inserted and then the other cup-half is turned into the housing and any one of a number of screw-holes in the opposite side of the housing may be utilized to receive a set-screw to be turned into the nearest available groove in this cup-half to fix its adjustment. In practice the screw-holes or set-screws in the housing may be so spaced that the last-inserted cup-half need be given a turn equal to only a third of the space between any two grooves to bring a groove into alinement with a set-screw. Thus a very fine and accurate adjustment of the balls may be secured.

In addition to the facility of accurately assembling and adjusting the bearing, this invention affords equal facility of taking apart the bearing for repairs or other purposes.

Referring to Fig. 1 as an instance of the use of the invention, it will be noticed that the inner bearing is located by the dust-guard cap 4 on one side and a journal screw-collar 18 on the other side, and the outer bearing is located by the journal shoulder 19 on one side and the nut 20 on the other. But the invention is not limited to these details.

What I claim is:—

1. The combination with a hub of a self-contained ball bearing comprising a ball-cone having a circular groove to receive the balls, said groove having a radius greater than that of said balls whereby each ball contacts said groove at a single point, a two-part cup, each part being provided with a narrow, concave, raised circular track having a radius greater than that of said balls whereby each ball contacts each track at a single point and means inclosing and uniting the parts of said cup, said means and the inclosed ball bearing being removable from said hub.

2. The combination with a hub of a self-contained ball bearing comprising a ball cone having a circular groove to receive the balls, said groove having a radius greater than that of said balls whereby each ball contacts said groove at a single point, a two-part cup, each part being provided with a narrow, concave, raised circular track having a radius greater than that of said balls whereby each ball contacts each track at a single point, and a housing inclosing said two-part cup for uniting and adjusting the parts thereof, said housing and inclosed ball bearing being removable from said hub.

3. The combination with a hub of a self-contained ball bearing comprising a ball cone having a circular groove to receive the balls, said groove having a radius greater than that of said balls whereby each ball contacts said groove at a single point, a two-part cup, each part being provided with a narrow, concave, raised circular track having a radius greater than that of said balls whereby each ball contacts each track at a single point, a housing screw-threaded to and inclosing said two-part cup for uniting and adjusting the parts thereof and means for fixing the adjustment thereof said housing and the inclosed ball bearing being removable from said hub.

4. The combination with a hub of a self-contained ball bearing comprising a cone provided with a circular groove to receive the balls, said groove having a radius greater than that of said balls, whereby each ball contacts said groove at a single point, a two-part cup, each part being independently adjustable and being provided with a narrow, concave, raised circular track having a radius greater than that of said balls whereby each ball contacts each track at a single point, and a housing inclosing the two parts of said cup for effecting the union and adjustment of the cup-parts therein said housing and the inclosed ball bearing being removable from said hub.

In testimony whereof I have hereunto set my hand this 20th day of May, A. D., 1908.

CHARLES R. JAMES.

Witnesses:
H. P. CURTISS,
MAY P. FLANAGAN.